United States Patent
Sydir et al.

(10) Patent No.: US 8,065,678 B2
(45) Date of Patent: *Nov. 22, 2011

(54) METHOD AND APPARATUS FOR SCHEDULING THE PROCESSING OF COMMANDS FOR EXECUTION BY CRYPTOGRAPHIC ALGORITHM CORES IN A PROGRAMMABLE NETWORK PROCESSOR

(75) Inventors: Jaroslaw J. Sydir, San Jose, CA (US); Chen-Chi Kuo, Pleasanton, CA (US); Kamal J. Koshy, Milpitas, CA (US); Wajdi Feghali, Boston, MA (US); Bradley A. Burres, Cambridge, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/380,575

(22) Filed: Feb. 27, 2009

(65) Prior Publication Data

US 2009/0271795 A1    Oct. 29, 2009

Related U.S. Application Data

(63) Continuation of application No. 10/747,852, filed on Dec. 29, 2003, now Pat. No. 7,512,945.

(51) Int. Cl.
*G06F 9/46* (2006.01)

(52) U.S. Cl. ........................................................ 718/100

(58) Field of Classification Search ................... 718/100
See application file for complete search history.

(56) References Cited

U.S. PATENT DOCUMENTS

| | | |
|---|---|---|
| 3,627,928 A | 12/1971 | Wolper et al. |
| 3,868,631 A | 2/1975 | Morgan et al. |
| 4,107,458 A | 8/1978 | Constant |
| 4,434,322 A | 2/1984 | Ferrell |
| 4,661,657 A | 4/1987 | Grenzebach et al. |
| 5,070,528 A | 12/1991 | Hawe et al. |
| 5,161,193 A | 11/1992 | Lampson et al. |
| 5,235,644 A | 8/1993 | Gupta et al. |
| 5,307,459 A | 4/1994 | Petersen et al. |
| 5,377,270 A | 12/1994 | Koopman et al. |
| 5,592,679 A * | 1/1997 | Yung ................................ 712/23 |
| 5,594,869 A | 1/1997 | Hawe et al. |
| 5,790,545 A | 8/1998 | Holt et al. |
| 5,860,072 A | 1/1999 | Schofield |

(Continued)

FOREIGN PATENT DOCUMENTS

WO    99/66678 A1    12/1999

OTHER PUBLICATIONS

Final Office Action received for U.S. Appl. No. 10/749,913, mailed on Apr. 7, 2009, 26 pages.

(Continued)

*Primary Examiner* — Meng An
*Assistant Examiner* — Mengyao Zhe
(74) *Attorney, Agent, or Firm* — Daly, Crowley, Mofford & Durkee, LLP (57) ABSTRACT

A method and apparatus for scheduling the processing of commands by a plurality of cryptographic algorithm cores in a network processor.

8 Claims, 7 Drawing Sheets

U.S. PATENT DOCUMENTS

| | | | |
|---|---|---|---|
| 5,996,086 | A | 11/1999 | Delaney et al. |
| 6,061,449 | A | 5/2000 | Candelore et al. |
| 6,061,779 | A | 5/2000 | Garde |
| 6,064,976 | A | 5/2000 | Tolopka |
| 6,105,053 | A * | 8/2000 | Kimmel et al. ............... 718/105 |
| 6,157,955 | A | 12/2000 | Narad et al. |
| 6,295,604 | B1 | 9/2001 | Callum |
| 6,341,335 | B1 | 1/2002 | Kanai et al. |
| 6,363,444 | B1 | 3/2002 | Platko et al. |
| 6,477,646 | B1 | 11/2002 | Krishna et al. |
| 6,557,095 | B1 | 4/2003 | Henstrom |
| 6,606,692 | B2 | 8/2003 | Hill et al. |
| 6,625,150 | B1 | 9/2003 | Yu |
| 6,697,932 | B1 | 2/2004 | Yoaz et al. |
| 6,701,432 | B1 | 3/2004 | Deng et al. |
| 6,757,791 | B1 | 6/2004 | O'Grady et al. |
| 6,785,390 | B1 | 8/2004 | Hiraide |
| 6,829,315 | B1 | 12/2004 | Cruikshank |
| 6,853,635 | B1 | 2/2005 | Beshai |
| 6,868,082 | B1 | 3/2005 | Allen, Jr. et al. |
| 6,898,713 | B1 * | 5/2005 | Joly et al. ...................... 713/193 |
| 6,971,006 | B2 | 11/2005 | Krishna et al. |
| 7,069,447 | B1 | 6/2006 | Corder |
| 7,073,067 | B2 | 7/2006 | Mizrah |
| 7,082,534 | B2 | 7/2006 | Tardo |
| 7,165,824 | B2 | 1/2007 | Walmsley et al. |
| 7,245,616 | B1 | 7/2007 | Elnathan et al. |
| 7,512,945 | B2 | 3/2009 | Sydir et al. |
| 7,529,924 | B2 | 5/2009 | Sydir et al. |
| 7,543,142 | B2 | 6/2009 | Sydir et al. |
| 2002/0035681 | A1 | 3/2002 | Maturana et al. |
| 2002/0062444 | A1 | 5/2002 | Law |
| 2002/0078342 | A1 | 6/2002 | Matthews, Jr. |
| 2002/0083317 | A1 | 6/2002 | Ohta et al. |
| 2002/0108048 | A1 | 8/2002 | Qi et al. |
| 2002/0184487 | A1 | 12/2002 | Badamo et al. |
| 2002/0188839 | A1 | 12/2002 | Noehring et al. |
| 2002/0188871 | A1 | 12/2002 | Noehring et al. |
| 2002/0188885 | A1 * | 12/2002 | Sihlbom et al. ............... 713/600 |
| 2003/0002509 | A1 | 1/2003 | Vandenhoudt et al. |
| 2003/0046423 | A1 | 3/2003 | Narad et al. |
| 2003/0091036 | A1 | 5/2003 | Milliken et al. |
| 2003/0097481 | A1 | 5/2003 | Richter |
| 2003/0099254 | A1 | 5/2003 | Richter |
| 2003/0108205 | A1 | 6/2003 | Joyner et al. |
| 2003/0118185 | A1 | 6/2003 | Lambert |
| 2003/0135711 | A1 | 7/2003 | Shoemaker et al. |
| 2003/0169877 | A1 | 9/2003 | Liu et al. |
| 2003/0172104 | A1 | 9/2003 | Hooman et al. |
| 2003/0200330 | A1 | 10/2003 | Oelke et al. |
| 2003/0221074 | A1 * | 11/2003 | Satoyama et al. ............ 711/162 |
| 2004/0004964 | A1 | 1/2004 | Lakshmanamurthy et al. |
| 2004/0019782 | A1 | 1/2004 | Hawkes et al. |
| 2004/0019783 | A1 | 1/2004 | Hawkes et al. |
| 2004/0039936 | A1 | 2/2004 | Lai |
| 2004/0117642 | A1 | 6/2004 | Mowery et al. |
| 2004/0131186 | A1 | 7/2004 | Kasuya et al. |
| 2004/0148382 | A1 | 7/2004 | Narad et al. |
| 2004/0225885 | A1 | 11/2004 | Grohoski et al. |
| 2004/0250095 | A1 | 12/2004 | Feldman |
| 2004/0264502 | A1 | 12/2004 | Hulmani et al. |
| 2005/0138368 | A1 | 6/2005 | Sydir et al. |
| 2005/0141715 | A1 | 6/2005 | Sydir et al. |
| 2005/0149725 | A1 | 7/2005 | Sydir et al. |
| 2005/0149744 | A1 | 7/2005 | Sydir et al. |
| 2007/0006150 | A9 | 1/2007 | Walmsley |
| 2009/0287925 | A1 | 11/2009 | Sydir et al. |

OTHER PUBLICATIONS

Non-Final Office Action received for U.S. Appl. No. 10/749,035, mailed on Dec. 18, 2007, 18 pages.

Non-Final Office Action received for U.S. Appl. No. 10/749,913, mailed on Sep. 5, 2008, 19 pages.

Final Office Action received for U.S. Appl. No. 10/749,913, mailed on Apr. 24, 2008, 24 pages.

Non-Final Office Action received for U.S. Appl. No. 10/749,913, mailed on Dec. 26, 2007, 12 pages.

Final Office Action received for U.S. Appl. No. 10/749,913, mailed on Jun. 22, 2007, 14 pages.

Non-Final Office Action received for U.S. Appl. No. 10/749,913, mailed on Feb. 9, 2007, 12 pages.

"Ultra High Speed ASIC Network Technology that Fully Conforms to International Standard Interface", FIND, 20(3), 2002, pp. 48-53.

"SATURN User Network Interface for 9.953 Gbit/s", PMC-Sierra, 2001, 2 pages.

Palkert, T., "Optical Internetworking Forum Report", Network Elements Incorporated, Nov. 4, 1999,15 pages.

Bergen, C. et al., "Streaming Interface (NPSI) Implementation Agreement", The Network Processing Forum, Oct. 18, 2002, 87 pages.

"System Packet Interface Level 4 (SPI-4) Phase 2 Revision 1: OC-192 System Interface for Physical and Link Layer Devices", Optical Internetworking Forum, Oct. 15, 2003, 72 pages.

"Product Brief: Intel IXP2855 Network Processor", Intel Corporation, 2005, 8 pages.

Venkatachalam, M., "Integrated Data and Control Plane Processing Using Intel(R) IXP23XX Network Processors", Technology@Intel Magazine, Feb. 2005, 11 pages.

Ramaswamy, R., et al., "Considering Processing Cost in Network Simulations", ACM SIGCOMM Workshop, Aug. 2003, pp. 47-56.

Chou, W. "Inside SSL: Accelerating Secure Transactions", IEEE, IT PRO, Sep. 2002, pp. 37-41.

Acharya, M., et al., "Secure Comparison of Encrypted Data in Wireless Sensor Networks", 2002, 7 pages.

Pereira, R. et al., "The ESP CBC-Mode Cipher Algorithms", Network Working Group Request for Comments, RFC No. 2451, Nov. 1998, 14 pages.

Yoaz, A. et al., "Speculation Techniques for Improving Load Related Instruction Scheduling", IEEE, 1999, 12 pages.

Final Office Action received for U.S. Appl. No. 10/747,852, mailed on Sep. 3, 2008., 16 pages.

"Intel IXP2850 Network Processor: High-Speed, Secure Content Processing in a Single Chip", Intel Corporation 2002, pp. 1-6.

Non-Final Office Action received for U.S. Appl. No. 10/747,852, mailed on Mar. 19, 2008., 20 pages.

Non-Final Office Action received for U.S. Appl. No. 10/747,852, mailed on Dec. 10, 2007, 23 pages.

"Context switch", Free On-Line Dictionary of Computing, Dec. 18, 1996, 1 page.

Ex Parte Quayle Office Action received for U.S. Appl. No. 10/749,035, mailed on Jul. 25, 2008, 5 pages.

Final Office Action received for U.S. Appl. No. 10/749,035, mailed on Jun. 11, 2008, 18 pages.

Examiner Interview Summary received for U.S. Appl. No. 10/749,035, mailed on Sep. 24, 2007, 3 pages.

Non-Final Office Action received for U.S. Appl. No. 10/749,035, mailed Jun. 18, 2007, 16 pages.

Non-Final Office Action received for U.S. Appl. No. 10/749,035, mailed on Dec. 20, 2006, 19 pages.

Non-Final Office Action received for U.S. Appl. No. 10/749,035, mailed on Mar. 28, 2007, 15 pages.

Intel IXP2850 Network Processor; High-speed, secure content processing in a single chip, Intel Corporation, http://www.intel.com/design/network/prodbrf/25213601.pdf,(2002),1-6 pages.

Response to Office Action U.S. Appl. No. 10/749,035 dated Mar. 28, 2007.

Response to Office Action U.S. Appl. No. 10/749,035 dated Dec. 20, 2006.

Response to Office Action U.S. Appl. No. 10/749,035 dated Jun. 18, 2007.

Response to Final Office Action U.S. Appl. No. 10/749,035 dated Jun. 11, 2008.

Response to Final Office Action for U.S. Appl. No. 10/749,035 dated Jun. 11, 2008, 10 pages.

Response to Exparte Quayle Office Action U.S. Appl. No. 10/749,035 dated Jul. 25, 2008.

Response to Office Action U.S. Appl. No. 10/747,852 dated Mar. 19, 2008.

Response to Non Final Office Action for U.S. Appl. No. 10/747,852, filed Jun. 2, 2008, 19 pages.

Response to Final Office Action for U.S. Appl. No. 10/747,852, filed Nov. 3, 2008, 12 pages.
Response to Non-Final Office Action for U.S. Appl. No. 10/749,913, filed Mar. 12, 2007, 21 pages.
Response to Final Office Action for U.S. Appl. No. 10/749,913, filed Aug. 23, 2007, 16 pages.
Response to Final Office Action for U.S. Appl. No. 10/749,913, filed Feb. 8, 2008, 17 pages.
Response to Final Office Action for U.S. Appl. No. 10/749,913, filed Jun. 12, 2008, 18 pages.
Response to Non Final Office Action for U.S. Appl. No. 10/749,035, filed Feb. 22, 2007, 20 pages.
Response to Non Final Office Action for U.S. Appl. No. 10/749,035, filed Apr. 30, 2007, 11 pages.
Response to Non-Final Office Action for U.S. Appl. No. 10/749,035, filed Sep. 20, 2007, 6 pages.
Response to Non-Final Office Action received for U.S. Appl. No. 10/749,035, filed Mar. 3, 2008, 16 pages.
Response to Ex Parte Quayle Action for U.S. Appl. No. 10/749,035, filed Aug. 4, 2008, 9 pages.
Response to Final office action for U.S. Appl. No. 10/749,035, filed Jun. 30, 2008, 9 pages.
Response to Final Office action for U.S. Appl. No. 10/749,913, filed Nov. 1, 2007, 17 pages.
Response to Non Final Office action for U.S. Appl. No. 10/749,913, filed Jan. 8, 2009, 10 pages.
File History from related U.S. Appl. No. 10/741,676, filed Dec. 19, 2003.
Notice of allowance received for U.S. Appl. No. 10/747,852 mailed on Nov. 28, 2008, 9 pages.
Notice of Allowance received for U.S. Appl. No. 10/749,035 mailed on Dec. 12, 2008, 6 pages.
Final Office action received for U.S. Appl. No. 10/749,913 mailed on Apr. 13, 2010, 16 pages.
Response to Office action received for U.S. Appl. No. 10/749,913, filed Dec. 28, 2009, 18 pages.
Non final Office action received for U.S. Appl. No. 10/749,913 mailed on Sep. 29, 2009, 14 pages.
Response to office action received for U.S. Appl. No. 10/749,913, filed Jul. 10, 2009, 18 pages.
Amendment after Notice of allowance filed for U.S. Appl. No. 10/749/035, filed Jan. 27, 2009, 7 pages.
Non final action received for U.S. Appl. No. 12/455,038 mailed on Aug. 31, 2010, 14 pages.
Response to Non final office action for U.S. Appl. No. 12/455,038, filed Oct. 29, 2010, 10 pages.
Advisory action received for U.S. Appl. No. 10/749,913 mailed on Sep. 12, 2007, 4 pages.

* cited by examiner

METHOD AND APPARATUS FOR SCHEDULING THE PROCESSING OF COMMANDS FOR EXECUTION BY CRYPTOGRAPHIC ALGORITHM CORES IN A PROGRAMMABLE NETWORK PROCESSOR

CROSS REFERENCE TO RELATED APPLICATIONS

This application is a continuation of U.S. patent application Ser. No. 10/747,852, filed on Dec. 29, 2003, which issued as U.S. Pat. No. 7,512,945, and entitled, "METHOD AND APPARATUS FOR SCHEDULING THE PROCESSING OF COMMANDS FOR EXECUTION BY CRYPTOGRAPHIC ALGORITHM CORES IN A PROGRAMMABLE NETWORK PROCESSOR," is hereby incorporated by reference in its entirety.

BACKGROUND OF THE INVENTION

As is known in the art, a network processor is a programmable hardware device designed to process packets in a packet switching network at high speed. Network processors typically differ from other processors in that network processors include hardware that can rapidly perform protocol processing tasks.

As is also known, there is a trend to provide network processors which perform cryptographic processing of packet data. To facilitate the cryptographic processing, the network processors include cryptographic acceleration units (also referred to as "crypto units"). The crypto units accelerate the cryptographic processing of packet data to support cryptographic processing at line rate. One example of a network processor including a crypto unit is the Intel® IXP2850 network processor manufactured by Intel Corporation, 2200 Mission College Blvd. Santa Clara, Calif. 95052 USA.

Two types of cryptographic processing that are commonly performed on packet data are authentication processing (or more simply authentication) and ciphering processing (or more simply ciphering). Authentication is the process of creating a digest of the packet, which is sent along with the packet, and allows the receiver to verify that the packet was indeed sent by the sender (rather than by some third party) and was not modified in transit. Ciphering is the process of encrypting the packet, so that only the intended receiver, with the correct cryptographic key, can decrypt the packet and read its contents. The most commonly used security protocols perform both ciphering and authentication on each packet.

In order to support the ciphering of relatively small packets, the crypto units in the Intel® IXP2850 each have six processing contexts, which are each used to process one packet at a time. Each processing context contains storage for the cipher keys and algorithm context associated with the processing of one packet. Multiple processing contexts allow the latency of loading cryptographic key material and packet data to be hidden by pipelining the loading of data and key material into some of the contexts with the processing of data in other contexts. This allows the crypto unit to achieve close to full utilization of the cipher and authentication cores.

The crypto units in the Intel® IXP2850 implement the 3DES and AES cipher algorithms as well as the SHA1 authentication algorithm. Each of the crypto units contains a single AES core and a pair of 3DES and SHA1 cores because the structure of those algorithms make it difficult for a single core to operate at the required data rates. By implementing a pair of cores and allowing both cores to process data in parallel, the crypto units meet desired data rate requirements. This approach, however, presents a problem of how to schedule the operation of the individual cores within a pair.

There are several ways to solve this problem. For example, the contexts within a crypto unit can be divided into two groups and the each of the cores in a pair can be assigned to process requests from a group of contexts. Since the programmer controls which packets are processed by which processing context, this approach pushes the problem of load balancing work between the individual cores in a pair to the programmer.

For example, in a 3DES crypto unit the programmer must ensure that half of the packets requiring processing by the 3DES algorithm are assigned to one of the contexts serviced by one 3DES core, and the other half of the packets requiring processing by the 3DES algorithm are assigned to one of the contexts serviced by the other 3DES core.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

An exemplary embodiment of a network processor which performs encryption and decryption operations on incoming data packets is described. Numerous details are set forth below in order to provide a thorough understanding of the scheduling techniques and related apparatus used to process the packets. It should be apparent to one skilled in the art that variants of the below described techniques and apparatus may be used in other embodiments without deviating from the spirit and scope of the concepts described herein. For example, the concepts described below can be implemented in a security processor or other type of processor. Also, it should be appreciated that in some instances, well-known circuitry is not set forth in detail in order to promote conciseness and clarity in the description of the figures.

Figure 1:
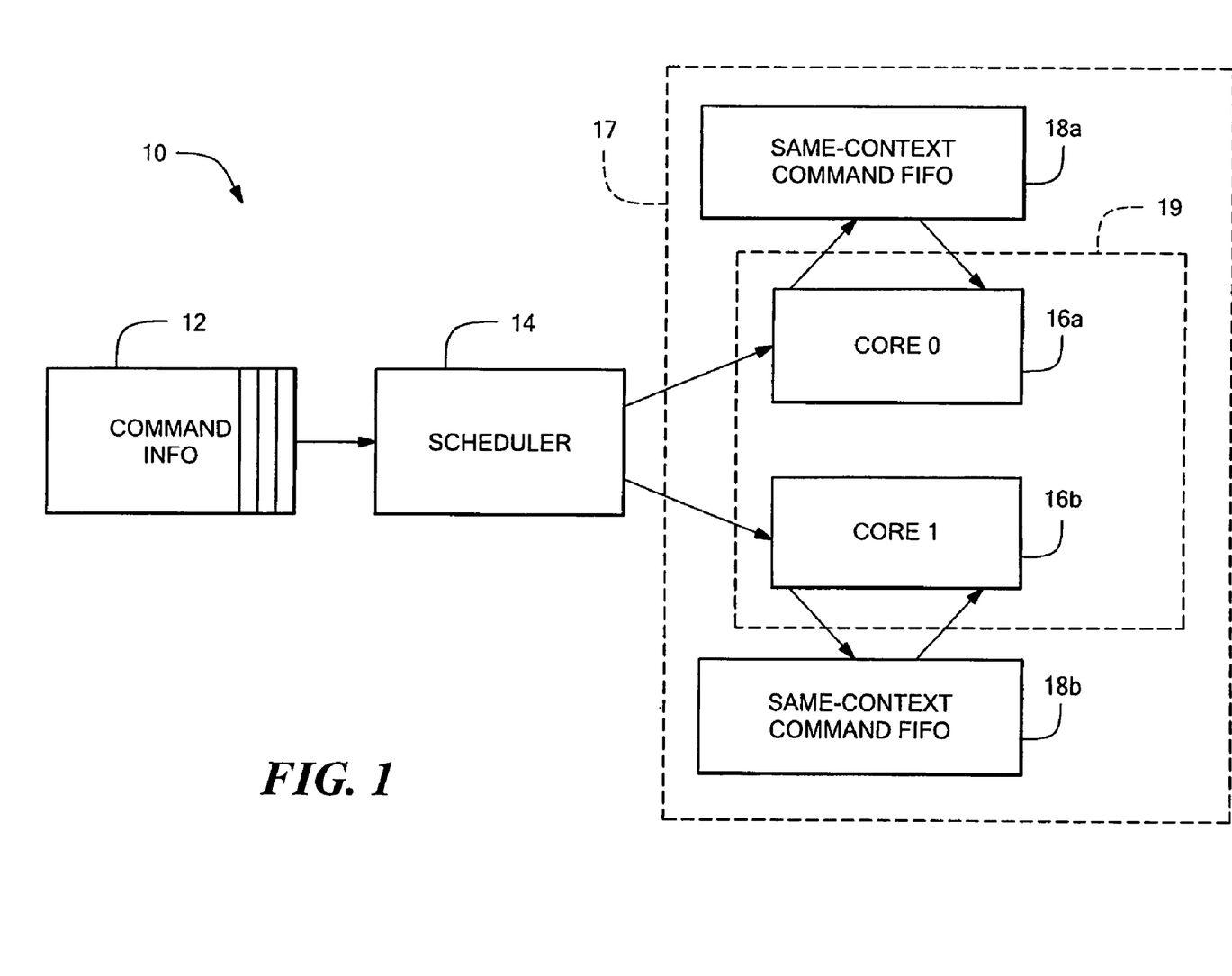
FIG. 1 is a block diagram of an exemplary network processor having a scheduler and a pair of same context command first-in-first-out (FIFO) queues coupled to respective ones of a pair of cores.

Referring now to FIG. 1, an exemplary network processor 10 includes a command first-in-first-out (FIFO) queue 12 coupled to a scheduler 14. It should be appreciated that FIFO 12 may be provided as any type of buffer which preserves the order of commands provided thereto. Commands exit the structure 12 in the same order in which they entered the structure 12.

The scheduler 14 receives commands from the command FIFO 12 and assigns the processing of the commands to one of a pair of cores 16a, 16b within a cryptographic acceleration unit 17 (also referred to as "crypto unit 17"). Each of the cores 16a, 16b has coupled thereto a same-context-command FIFO queue 18a, 18b.

The cores 16a, 16b form a core group 19. It should be understood that although in the exemplary embodiment of FIG. 1, the core group 19 is comprised of two cores 16a, 16b, in other embodiments the core group can be provided from any number of cores. The maximum number of cores which can be included in a core group is limited only by practical manufacturing considerations.

It should be appreciated that in preferred embodiments, the command FIFO 12 and scheduler 14 are provided as part of the crypto unit 17 and they receive commands from a global command FIFO and a global command scheduler provided as part of a processor (e.g. a network processor) of which the crypto unit 17 is also a part. One example of such an embodiment is described below in conjunction with FIG. 5A.

It should also be appreciated that the plurality of cores 16a, 16b can be adapted to process commands from any algorithm having a structure which makes it difficult for a single core to operate at desired or required data rates. For example, in one embodiment in which 3DES commands are processed, the cores 16a, 16b correspond to a pair of 3DES cores 16a, 16b (cores 16a, 16b also referred to herein as "core 0" and "core 1," respectively). Thus, in this case, the command FIFO 12 would correspond to a 3DES Command FIFO 12 and the commands for 3DES processing would be queued in the 3DES Command FIFO 12. Similarly, the same-context-command FIFOs 18a, 18b would correspond to 3DES same-context-command FIFOs 18a, 18b.

In another embodiment in which MD5 commands are processed, the cores 16a, 16b correspond to a pair of MD5 cores 16a, 16b. Thus, in this case, the command FIFO 12 would correspond to an MD5 command FIFO 12 and the commands for MD5 processing would be queued in the MD5 command FIFO 12. Similarly, the same-context-command FIFOs 18a, 18b would correspond to MD5 same-context-command FIFOs 18a, 18b.

In yet another embodiment in which SHA1 commands are processed, the cores 16a, 16b correspond a pair of SHA1 cores 16a, 16b. Thus, in this case, the command FIFO 12 corresponds to a SHA1 command FIFO 12 and the commands for SHA1 processing are queued in the SHA1 command FIFO 12. Similarly, the same-context-command FIFOs 18a, 18b would correspond to SHA1 same-context-command FIFOs 18a, 18b.

In view of the above, it should be understood that although only one pair of cores (i.e. one core group 19) is shown in FIG. 1, a practical network processor is likely to include multiple pairs of cores (i.e. multiple core groups) with associated same context command FIFOs with each of the pairs adapted to process one of a plurality of different cipher and authentication algorithms. A practical network processor is also likely to include a global command FIFO queue and global command scheduling logic (e.g. a global command scheduler) to direct commands to a particular one of a plurality of command FIFOs for a particular core group (e.g. command FIFO 12 for core group 19).

Assuming that cores 16a, 16b each correspond to 3DES cores, and that core 16a completes processing a command, then core 16a checks to see if there are any commands waiting in its same-context-command FIFO 18a. If there are, then core 16a processes the command at the head of the Same-context-command FIFO 18a. If the FIFO 18a is empty, then 3DES Core 0 16a indicates to the scheduler 14 that it is idle. The scheduler then checks to see if there are any commands in the 3DES Command FIFO 12. If there are, then the scheduler 14 checks to see if the context specified with the command at the head of the FIFO 12 corresponds to the context of the command being processed by 3DES core 1 16b. If the contexts are the same, the command is queued in the same-context-command FIFO 18b associated with 3DES core 1 16b and the scheduler performs the same process on the next command in the 3DES command FIFO.

If the context specified in the command at the head of the 3DES Command FIFO 12 is not the same as the context of the command being processed by 3DES Core 1 16b, or if the 3DES Core 1 16b is idle, the scheduler 14 can give the command at the head of the 3DES command FIFO 12 to either the 3DES core 0 16a or the 3DES core 1 166. Assuming that in response to such a condition (i.e. both cores 16a, 16b and idle) that the scheduler assigns the command to core 16a, then the 3DES core 16a begins processing the command. Because commands are assigned to be processed by a core only when the core has become idle, the scheduler 14 achieves load balancing between the cores 16a, 16b.

It should be appreciated that although the exemplary embodiment of FIG. 1 is described in the context of 3DES cores and algorithms, this same scheduling structure can be used if the cores 16a, 16b corresponded to a pair of MD5 cores or a pair of SHA1 cores. It should also be appreciated that although the technique is described in FIG. 1 as implemented for pairs of algorithm cores (e.g. a pair of 3DES cores), the technique also applies to the scheduling of any number of algorithm cores (e.g. three or more cores).

It should also be understood that although in a preferred embodiment, each core included within a core group is identical, this need not be so. That is, each core in a core group may have different processing characteristics. In the case where one core has a faster processing characteristic than another core within a core group, the scheduler 14 will automatically handle the load balancing between each core in the core group. The only requirement for a core group is that each core within the group be processing the same algorithm.

Figure 2:
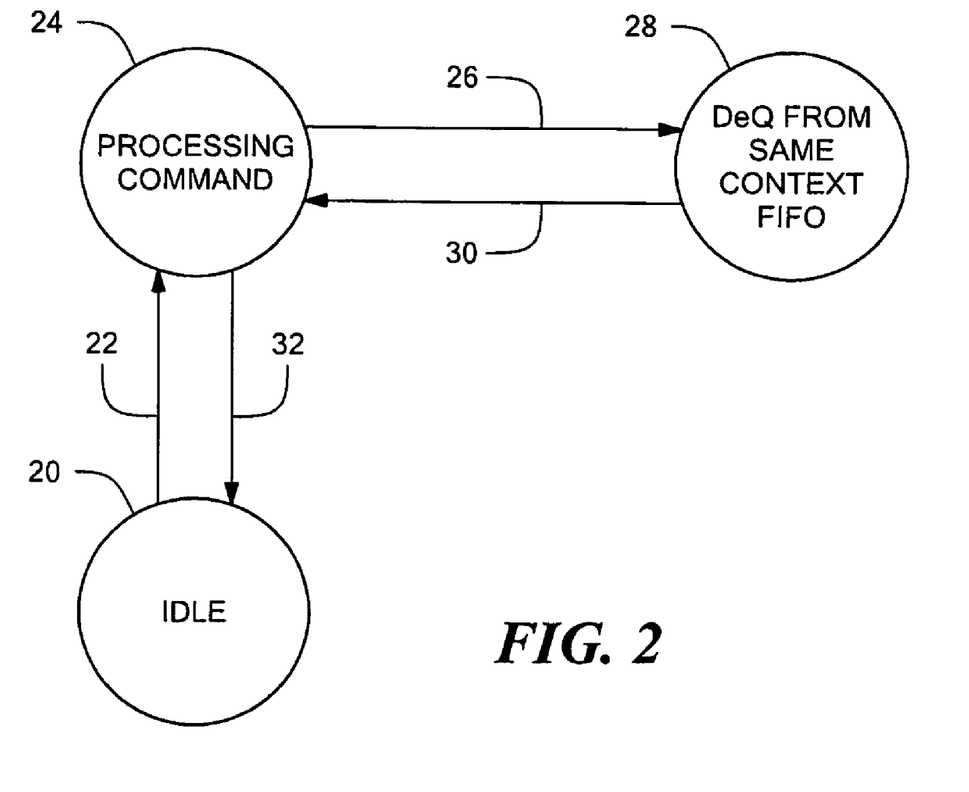
FIG. 2 is a flow diagram which illustrates a state machine for one of the cores.

Referring now to FIG. 2, a state diagram for one of the cores shown in FIG. 1 (i.e. either core 16a or 16b) includes three states. The core is initially in an idle state 20. In response to a command received from a scheduler, the core moves along transition 22 to a processing command state 24 in which the core processes the command. From state 24, once the core completes processing the command, if a same-context-command FIFO associated with the core does not hold a command, the core proceeds back to idle state 20 (along transition 32). If, on the other hand, the core's same-context-command FIFO holds a command, then the core proceeds to state 28 (along transition 26), in which the command is de-queued from the same-context-command FIFO and the core returns to state 24 (along transition 30) where the de-queued command is processed. Once the core has processed all commands and its same context command FIFO is empty, the core returns to its idle state 20 (along transition 32).

Figure 3:
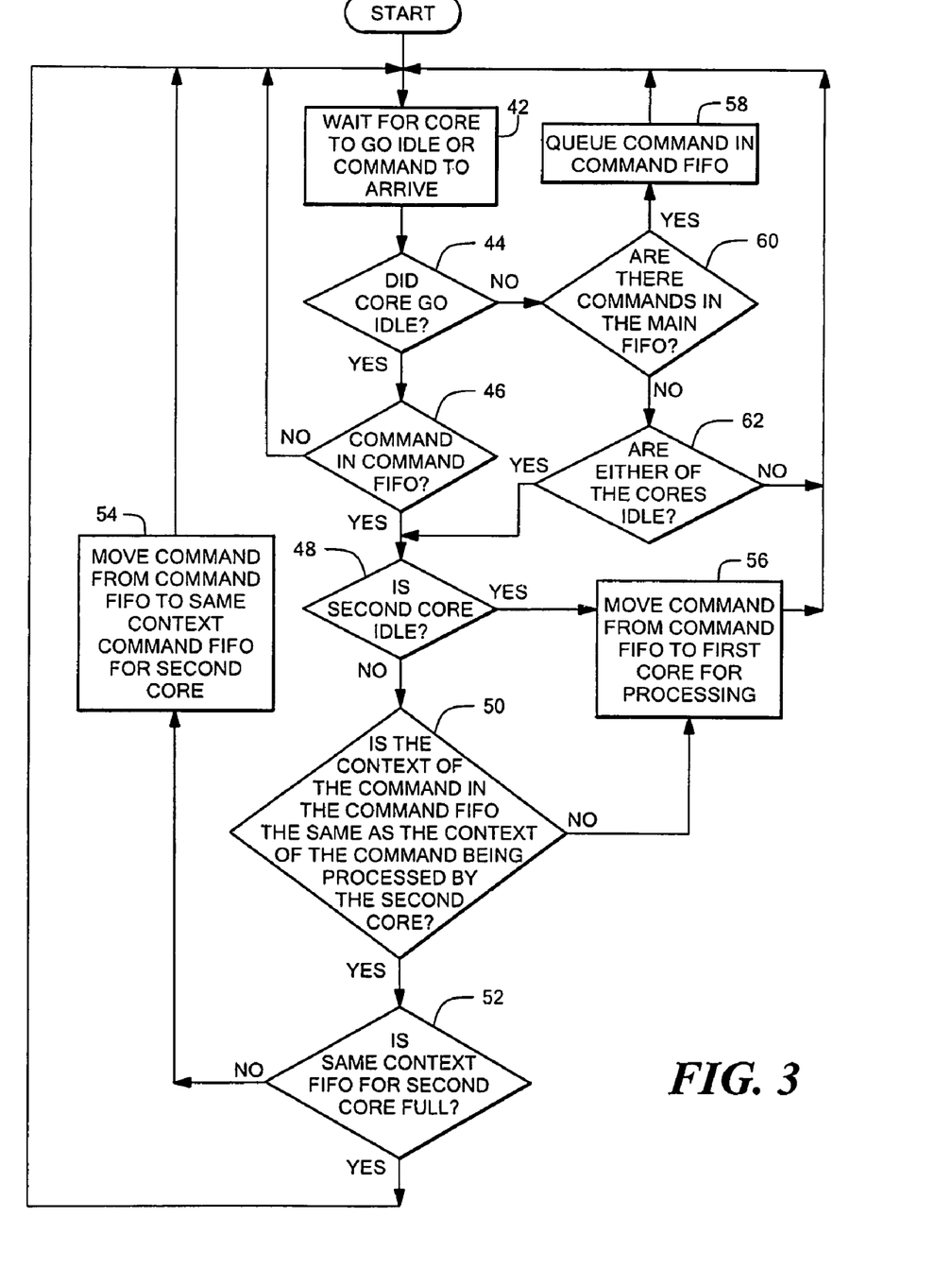
FIG. 3 is a flow diagram which illustrates a command scheduling technique associated with cores in a processor.

FIG. 3 illustrates a command scheduling technique associated with cores in a processor (e.g. a network processor or a security processor), which includes one or more groups of cores to process packets. It should be understood that although the processing described in conjunction with FIG. 3 below assumes that the group of cores is comprised of two cores (referred to as first and second core in FIG. 3), it is recognized that the concepts and techniques described in conjunction with FIG. 3 apply regardless of the specific number of cores within the group of cores and regardless of the number of core groups. Thus, processor can include any number of core groups and each of the core groups can include any number of cores.

The rectangular elements in the flow diagram (typified by element 42 in FIG. 3), are herein denoted "processing blocks" and represent computer software instructions or groups of instructions. The diamond shaped elements (typified by element 44 in FIG. 3) are herein denoted "decision blocks" and represent computer software instructions, or groups of instructions which affect the execution of the computer software instructions represented by the processing blocks.

Alternatively, the processing and decision blocks represent processing steps performed by functionally equivalent circuits. The flow diagram does not depict the syntax of any particular programming language. Rather, the flow diagram illustrates the functional information one of ordinary skill in the art requires to fabricate circuits or to generate computer code to perform the processing required of the processor. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

It should be appreciated that in the description of FIG. 3, it is assumed that a crypto unit includes two cores and that if both cores are idle, the scheduler will assign the next command to whichever core is identified as the first core of the two cores (e.g. the core identified as core 0 in FIG. 1).

Turning now to FIG. 3, processing begins at block 42 where the system waits until either a core goes idle or until a command is received. When either of these conditions is found to exist, a determination is made as to which condition (i.e. an idle core condition or a command received condition) has occurred. In the flow diagram of FIG. 3 this is done in decision block 44 by determining whether a core has entered an idle state. In a system having a pair of cores (e.g. cores 16a, 16b in FIG. 1), a check is made to determine whether either of the cores has gone idle.

A determination of whether an idle core condition or a command received condition has occurred could also be made by checking if a command has just arrived into the command FIFO (i.e. rather than checking to see if a core has entered an idle state). Other techniques could also be used to make the same determination.

If in decision block 44, a decision is made that a core has gone idle, then processing proceeds to decision block 46. For the purposes of the remainder of this flow diagram, it is assumed that it is the first core in the core group which has gone idle (e.g. core 16a in FIG. 1). In decision block 46, the scheduler 14 checks to see if there are any commands in a command FIFO (e.g. command FIFO 12, FIG. 1). If no commands are in the command FIFO 12, then processing returns to step 42.

If in decision block 46 the scheduler 14 finds a command in the command FIFO 12, then processing proceeds to decision block 48 in which a decision is made as to whether the second core (e.g. core 16b in FIG. 1) in the group of cores is idle. If the second core is idle, then the command in the command FIFO is de-queued from the command FIFO and is assigned directly to the first core for processing.

If in decision block 48, a decision is made that the second core (e.g. core 16b) is not idle, then processing proceeds to decision block 50 in which a decision is made as to whether the context of the command in the command FIFO is the same as the context of the command currently being processed by the second core. That is, the scheduler checks to see if the context specified within the command at the head of the command FIFO corresponds to the context of the command being processed by the second core.

If the context is the same, then processing proceeds to decision block 52 in which a decision is made as to whether the same-context-command FIFO (e.g., same-context-command FIFO 18b, FIG. 1) is full. If the same-context-command FIFO (e.g. same-context-command FIFO 18b in FIG. 1) is full, then the command is left in the command FIFO and processing returns to step 42.

If the same-context-command FIFO for the second core is not full, then the command is queued in the same-context-command FIFO for the second core as shown in block 54. Processing then flows back to block 42. FIG. 3 assumes that new commands arrive and cores go idle only when the scheduler is in processing block 42. In an actual implementation, these events can occur at any time and the scheduler has to remember that they occurred to trigger the appropriate actions when the scheduler returns to processing block 42.

If in decision block 48, a decision is made that the context specified in the command at the head of the command FIFO is not the same as the context of the command being processed by the second core, then processing proceeds to processing block 56 in which the scheduler gives the command at the head of the command FIFO to the first core and the first core begins processing the command. Processing then flows back to block 42.

Returning to step 42, an alternate path can be followed. If processing flows to processing block 44 due to the arrival of a command (rather than a core going idle), then processing proceeds to decision block 60 in which a determination is made as to whether there are commands in the command FIFO. If there are already one or more commands in the command FIFO, the command is merely queued to the command FIFO at processing block 58 and the process returns to step 42.

However, if there are presently no commands in the command FIFO, the process continues to block 62 in which a decision is made as to whether either the first or the second cores (e.g. either of cores 16a, 16b in FIG. 1) is currently idle. If neither core is idle, the process returns to step 42. If one or both of the cores are idle, the process proceeds to step 48 and continues as described above. If both cores are idle the scheduler automatically selects the first core to be the idle core to which a command will be assigned.

It should be noted, however, that the scheduler could be arranged so that when it finds both cores idle, it automatically assign a command in the command FIFO to the second core. That is, in the case where more than one core within a core group is idle, the scheduler can assign the command to any of the idle cores. Thus, as noted above, in the case where both first and second cores (e.g. first and second cores 16a, 16b) are idle, the scheduler can assign the command to either core in processing block 56. In a practical systems, however, for simplicity, in the case where more than one core is idle, the command is always assigned to a predetermined one of the cores, i.e., a default core.

For the purposes of the remainder of this diagram it is assumed that the first core is idle or is selected in the case that both cores are idle.

With this technique, because commands are assigned to be directly processed by a core only when the core has become idle, bypassing a corresponding same-context-command FIFO, the scheduler achieves load balancing between the pair of cores (e.g. the scheduler 14 achieves load balancing between the cores 16a, 16b in FIG. 1).

As mentioned above, the processing described in conjunction with FIG. 3 assumes that the group of cores is provided from two cores (e.g. cores 16a, 16b describe above in conjunction with FIG. 1). It should be appreciated, however, that in the case where the group of cores includes more that two cores, the processing in decision blocks 48, 50, 52, and 54 must be done for each of the cores in the group before the command in the command FIFO can be assigned to one of the cores in the group. In this case, the scheduler achieves load balancing between all of the cores in the group of cores.

Figure 4:
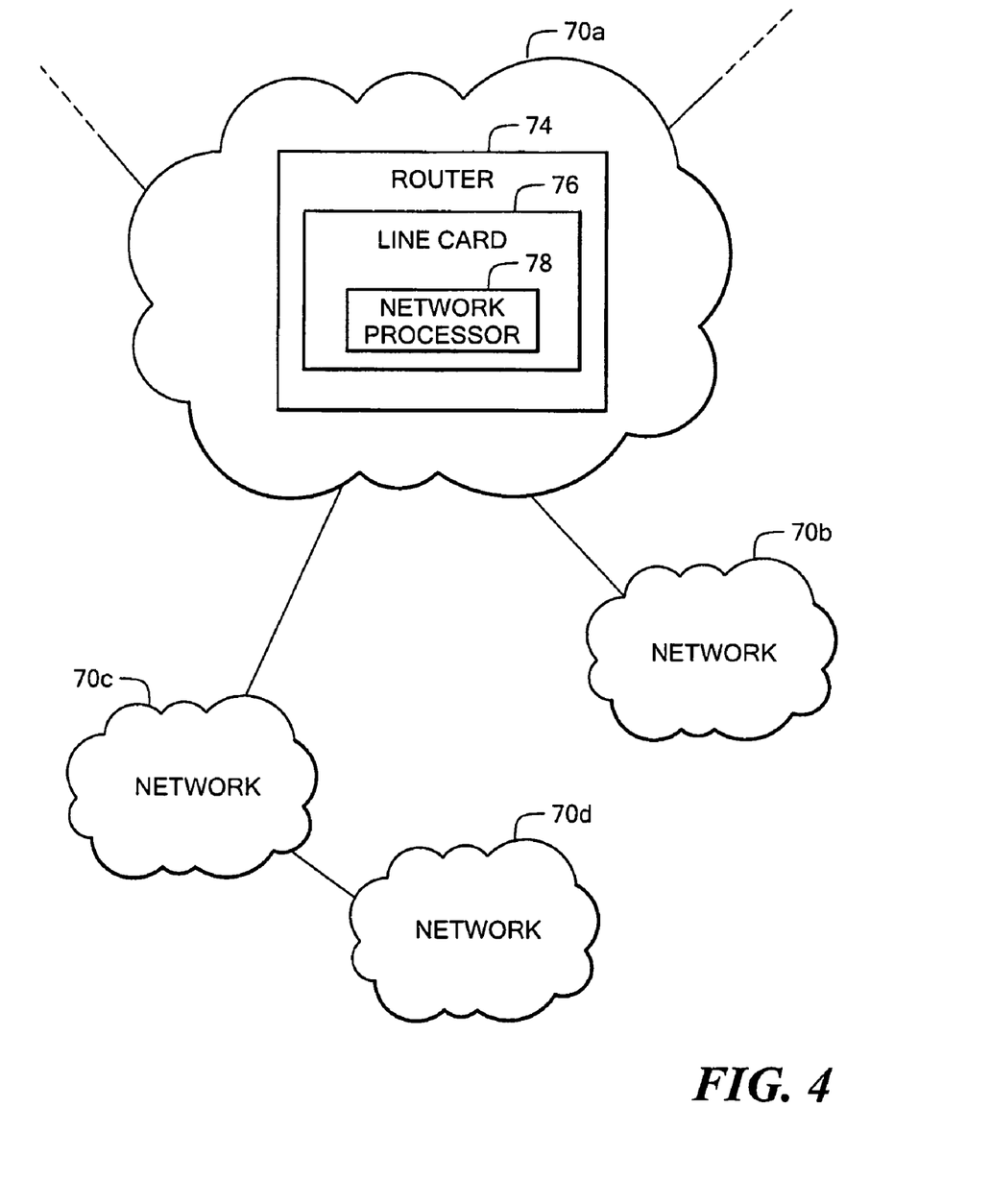
FIG. 4 is a block diagram of a system which includes a network processor which utilizes the scheduling technique described in conjunction with FIG. 3.

Referring now to FIG. 4, an exemplary network 70 includes a plurality of interconnected networks nodes of which four network nodes 72a-72d are shown. Taking network node 70a as exemplary of one or more of the network nodes 70b-70d, network node 70a includes a router 74 which in turn includes a line card switching device 76 (or more simply a line card 76). The line card 76 includes a network processor 78 having a network processor crypto unit which includes one or more core groups with each of the core groups having two or more cores and with each of the two or more cores having an associated same-context command FIFO as described above in conjunction with FIGS. 1-3.

The network processor 78 thus forms part of a line card 76 within the switching device 74. The switching device 74 can be coupled to the other network nodes 70b-70d, in a manner well known in the art.

It is understood that the switching device can be provided from a variety of devices that include cryptographic data processing, such as a network router. Various network applications, configurations, switching devices, and topologies for the network and network processor will be readily apparent to one of ordinary skill in the art.

Figure 5:
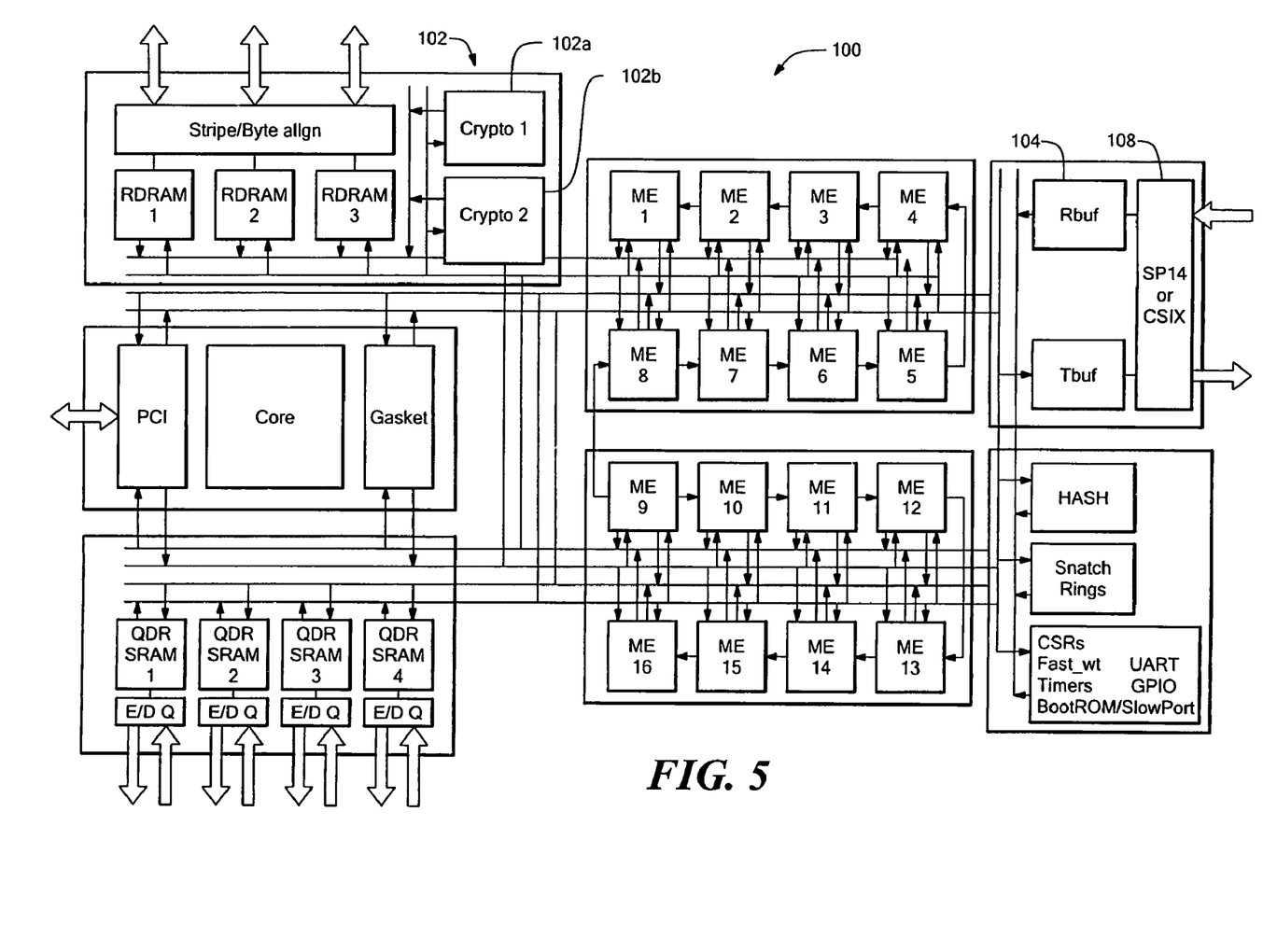
FIG. 5 is a block diagram of a portion of an exemplary network processor having cryptographic processing units at least one of which includes a scheduler and a pair of same context command first-in-first-out (FIFO) queues coupled to respective ones of a plurality of cores.

Referring now to FIG. 5, an exemplary network processor 100 includes a crypto system 102 having first and second cryptography acceleration units 102a, 102b (crypto units 102a, 102b). Crypto units 102a, 102b transmit data in blocks to a Media Switch Fabric (MSF) unit 104 via an alignment buffer. The MSF unit 104 handles the transmission of data over an interface 108, such as an SPI4.2/NPSI interface. It is understood that to promote comprehension and clarity in this description, components of the network processor 100 not relevant to the features described herein may not be shown or described. The crypto units 102a, 102b accelerate the cryptographic processing of packet data to support crypto processing at line rate. In operation, data is processed by the crypto units 102a, 102b and the ciphered data is aligned and then sent to the MSF unit 104 for transmission over the interface 108.

In an exemplary embodiment, the crypto system 102 implements the following cipher algorithms: 3DES/DES, AES, and RC4. The 3DES/DES and AES algorithms are block cipher algorithms, which means that they process data in discrete blocks and the RC4 algorithm is a stream cipher that processes data one byte at a time. In one particular embodiment, the crypto units 102a, 102b each implement the following well-known authentication algorithms: MD5, SHA1, and AES-XCBC-MAC, which are block-oriented algorithms.

Figure 5A:
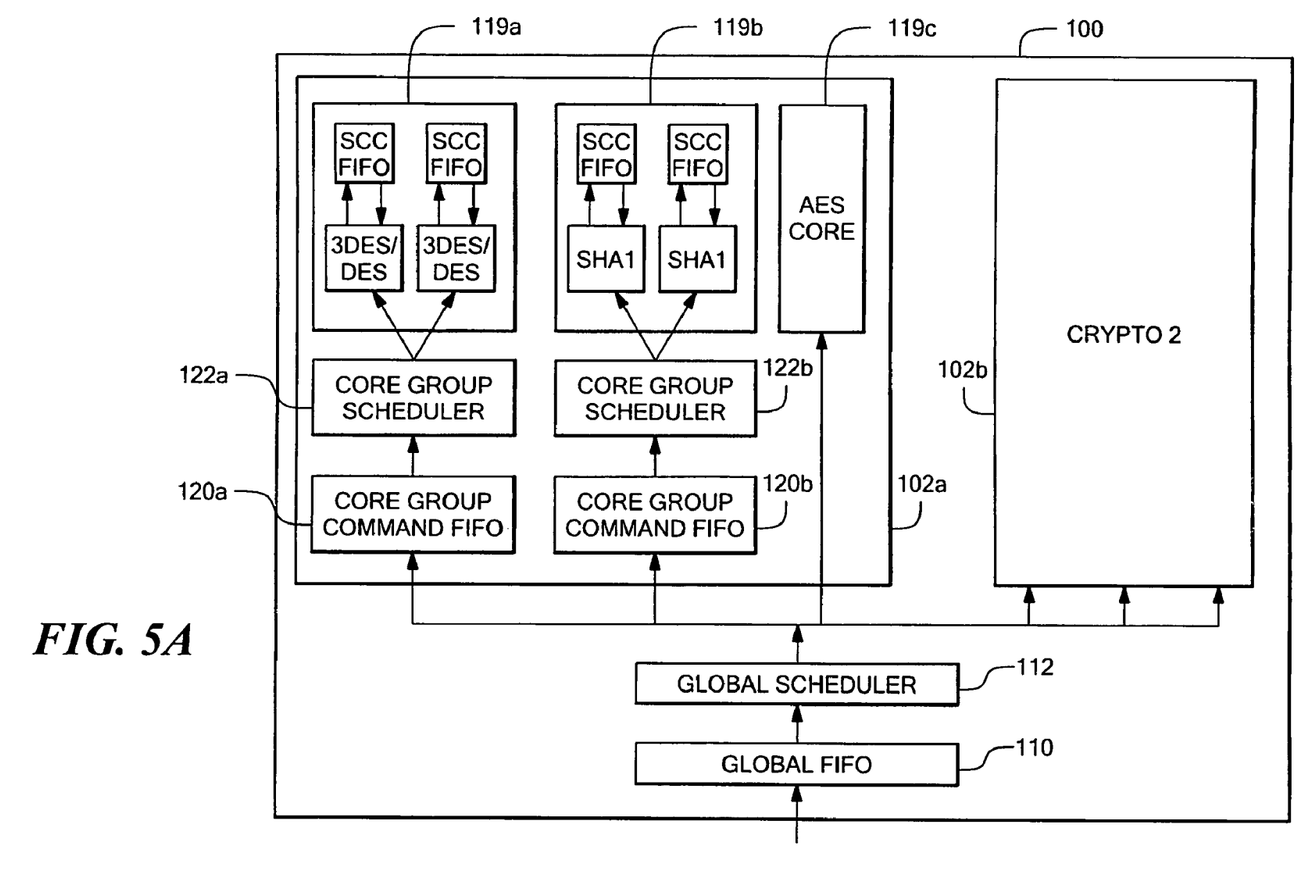
FIG. 5A is a block diagram showing additional details of one of the cryptographic acceleration units in the network processor of FIG. 5.

Referring now to FIG. 5A in which like elements of FIG. 5 are provided having like reference designations, the network processor 100 includes a global command FIFO queue 110 which receives commands provided to the network processor 100 and provides the commands to a global command scheduler 112. The global command scheduler 112 directs at least some of the commands provided thereto to a particular one of the plurality of crypto units 102a, 102b.

Taking crypto unit 102a as exemplary of crypto unit 102b, in the embodiment shown in FIG. 5A, each of the crypto units 102a, 102b contains a plurality of core groups 119a, 119b, 119c. Core group 119a contains a pair of 3DES/DES cores and associated same-context command FIFOs (SCC FIFOs). Core group 119b contains a pair of SHA1 cores and associated SCC FIFOs and core group 119c contains a single AES core.

When the global command scheduler 112 has a command for the 3DES/DES cores in core group 119a, the global scheduler 112 directs the commands to the crypto unit 102a. A core group command FIFO 120a within crypto unit 102a receives the commands and provides the commands to a 3DES/DES core group scheduler 122a also within the crypto unit 102a. The 3DES/DES core group scheduler 122a receives commands from the command FIFO 120a and assigns the processing of the commands to one of the pair of 3DES/DES cores within the core group 119a.

Similarly, when the global command scheduler 112 has a command for the SHA1 cores, the global scheduler 112 directs the commands to the core group command FIFO 120b which provides the commands to a SHA1 core group scheduler 122b. The SHA1 core group scheduler 122b receives commands from the command FIFO 120b and assigns the processing of the commands to one of the pair of SHA1 cores within the cryptographic acceleration unit 102a. Thus, the global command FIFO queue 110 receives commands provided to the network processor 100 and then directs commands to a particular one of the plurality of core group command FIFOs contained within the crypto units 102a, 102b for processing by a particular core group via the global scheduler 112.

Figure 5B:
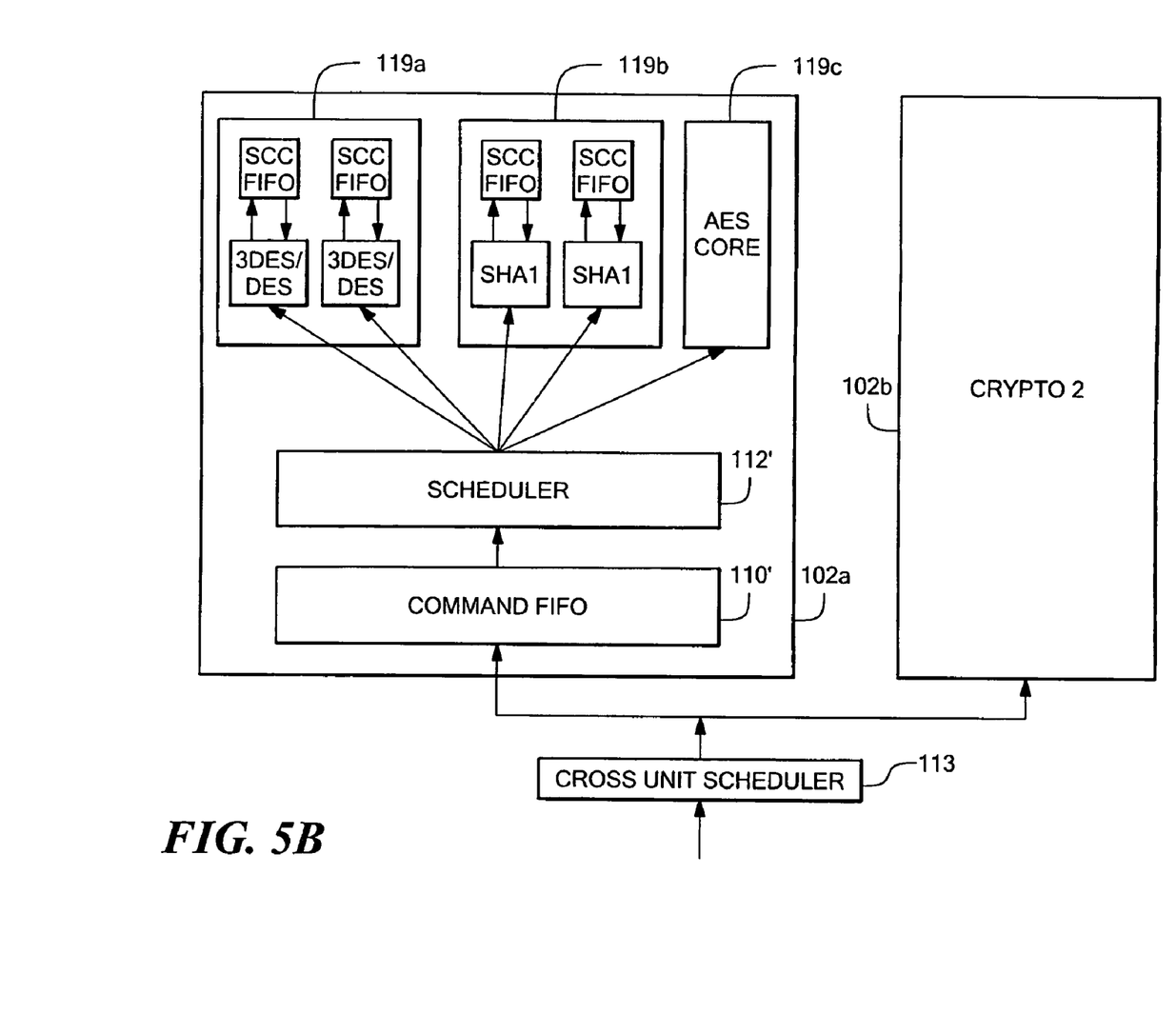
FIG. 5B is a block diagram of a processor having a cryptographic acceleration unit which includes a single scheduler and command FIFO.

Referring now to FIG. 5B, it should be appreciated that in a preferred embodiment, each of the crypto units 102a, 102b can include a queue and scheduler. In such an embodiment, a cross unit scheduler 113 (which may be implemented in software or hardware) schedules the use of the two crypto units 102a, 102b. The scheduler 112' within each crypto unit gives commands to the core groups 119a, 119b, 119c depending upon the algorithm that is required to process a received packet (e.g. packets which must be processed using 3DES/DES are provided to core group 119a, packets which must be processed using SHA1 are provided to core group 119b, and packets which must be processed using AES are provided to core group 119c). Thus, the processor may be implemented in such a manner that the cross unit scheduler handles the scheduling between the plurality of crypto units and the FIFO 110' and scheduler 112' are provided as part of each of the crypto units and simply provide commands to the appropriate core group within the crypto unit. It should thus be appreciated that the scheduling techniques described above in conjunction with FIGS. 1-3 above may be utilized regardless of the particular manner in which the scheduling hardware is implemented.

While the embodiments described herein are primarily shown and described in conjunction with a network processor having a crypto unit with only two cores (i.e. one core group), it is understood that embodiments are applicable to network processors in general. For example, it will be appreciated that any number of crypto units, each having any number of core group (and each core group having any number of cores) can be used without departing from the scope of the present embodiments. In addition, the number of cipher and authentication cores and processing contexts, as well as the supported algorithm types, can vary without departing from the scope of the present embodiments.

All references cited herein are hereby incorporated herein by reference in their entirety.

Having described preferred embodiments which serve to illustrate the inventive concepts, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A processor comprising:
 a command first-in-first-out (FIFO) configured to store cipher algorithm commands, the cipher algorithm commands comprising a first cipher algorithm command;
 cryptographic cores;
 same-context-command FIFOs configured to store cipher algorithm commands of a same context, each of the same-context-command FIFOs coupled to a corresponding one the cryptographic cores; and
 a scheduler being coupled to each of the cryptographic cores and to the command FIFO and configured to:
 receive the first cipher algorithm command from the command FIFO;
 determine which of the cryptographic cores is processing a second cipher algorithm command;
 in response to one of the cryptographic cores in the core group processing a second cipher algorithm command, determine if the first cipher algorithm command received from the command FIFO is in the same context as the second cipher algorithm command being processed by the cryptographic core; and
 assign the first cipher algorithm command to a same-context-command FIFO corresponding to the cryptographic core processing the second cipher algorithm command if the first cipher algorithm command and the second cipher algorithm command are in the same context.

2. The processor of claim 1 wherein the cryptographic cores correspond to a first plurality of cryptographic cores in a first core group and the processor further comprises a plurality of core groups, each of the core groups coupled to the command FIFO.

3. The processor of claim 1 wherein the cryptographic cores correspond to a first plurality of cryptographic cores in a first core group and the processor further comprises:
 a plurality of core groups; and
 the command FIFO corresponds to a first one of a plurality of command FIFOs, each of the plurality of command FIFOs coupled to a corresponding one of the plurality of core groups.

4. The processor of claim 3 wherein the same context command FIFOs are provided such that each of the cryptographic cores in the plurality of core groups is coupled to a corresponding one of the plurality of same-context-command FIFOs.

5. A network comprising:
 a first node comprising a processor, the processor comprising:
 a command first-in-first-out (FIFO) configured to store cipher algorithm commands, the cipher algorithm commands comprising a first cipher algorithm command;
 cryptographic acceleration cores;
 same-context-command FIFOs configured to store cipher algorithm commands of a same context, each of the same-context-command FIFOs coupled to a corresponding one the cryptographic cores; and
 a scheduler coupled to the command FIFO and to each of the cryptographic acceleration cores; and
 an interface configured to couple the first node to another node;
 wherein the scheduler is configured to:
 receive the first command from the command FIFO;
 determine which of the cryptographic acceleration cores is processing a second cipher algorithm command;
 in response to one of the cryptographic acceleration cores in the core group processing a second cipher algorithm command, determine if the first cipher algorithm command received from the command FIFO is in the same context as the second cipher algorithm command being processed by the cryptographic acceleration core; and
 assign the first cipher algorithm command to a same-context-command FIFO corresponding to the cryptographic acceleration core processing the second cipher algorithm command if the first command and the second cipher algorithm command are in the same context.

6. The network of claim 5 further comprising:
 a network communication path coupled to the first node;
 a second node having a processor, the processor comprising:
 a command first-in-first-out (FIFO) configured to store cipher algorithm commands;
 cryptographic acceleration cores;
 same-context-command FIFOs configured to store cipher algorithm commands of a same context, each of the same-context-command FIFOs coupled to a corresponding one the cryptographic cores; and
 a scheduler coupled to the command FIFO and to each of the cryptographic acceleration cores of the second node; and
 an interface coupled to the first node through the network communication path.

7. The method of claim 1 wherein the cipher algorithm commands comprise at least one of MD5 commands, 3DES commands or SHA1 commands.

8. The method of claim 5 wherein the cipher algorithm commands comprises at least one of MD5 commands, 3DES commands or SHA1 commands.

* * * * *